Dec. 17, 1935.   H. D. HUME ET AL   2,024,735
HARVESTER REEL
Filed Feb. 4, 1935   2 Sheets-Sheet 1

Horace D. Hume
James F. Love
Inventors

By Herbert E. Smith
Attorney

Dec. 17, 1935.   H. D. HUME ET AL   2,024,735
HARVESTER REEL
Filed Feb. 4, 1935   2 Sheets-Sheet 2
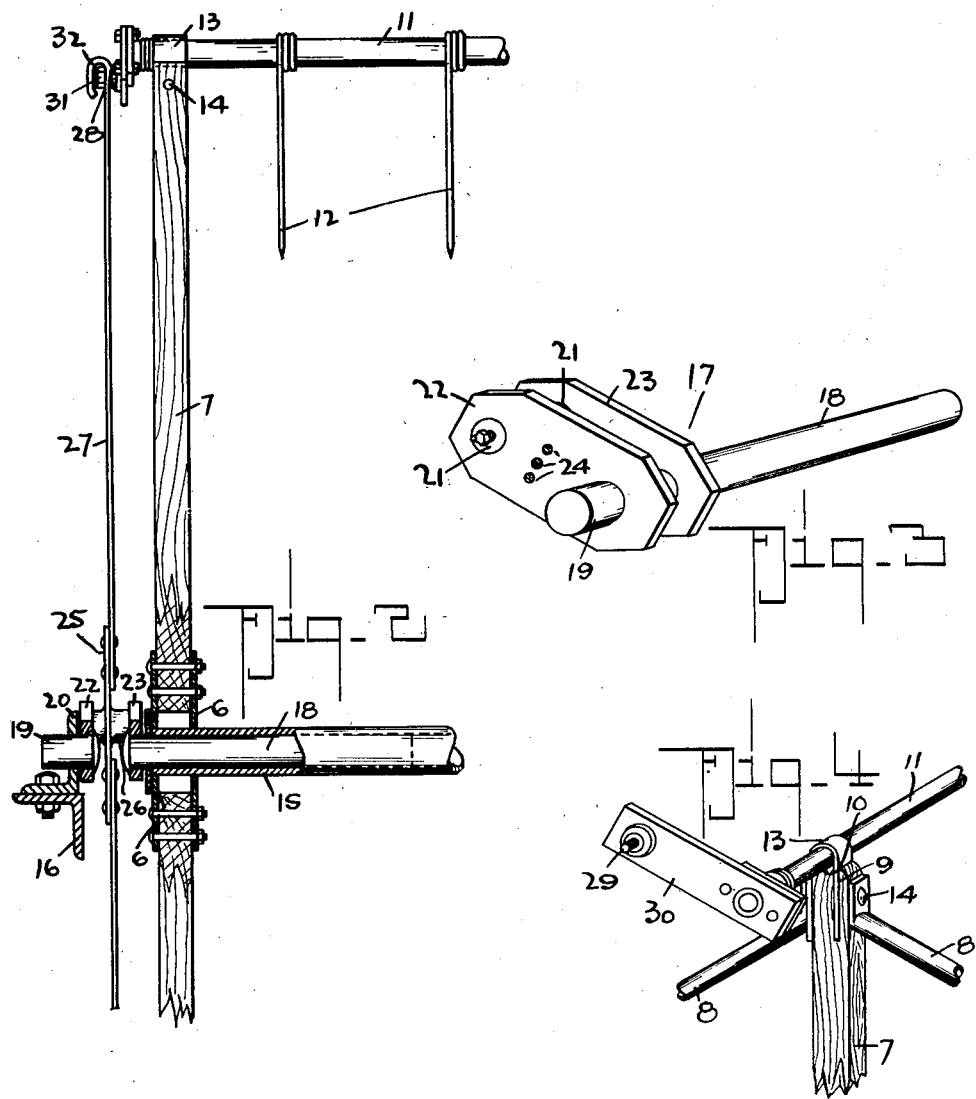
Horace D. Hume
James E. Love
Inventors
By   Herbert E. Smith
Attorney Patented Dec. 17, 1935

2,024,735

UNITED STATES PATENT OFFICE 2,024,735

HARVESTER REEL

Horace D. Hume and James E. Love, Garfield, Wash., assignors to Hume-Love Company, Garfield, Wash., a corporation of Washington Application February 4, 1935, Serial No. 4,830

3 Claims. (Cl. 56—220)

Our invention relates to improvements in harvester reels and an important object of the invention is to provide a reel which is adjustable to meet a wide variety of harvesting conditions and which is especially adaptable for harvesting leguminous crops, as peas, beans, or any other crop grown on vines and which is usually disposed close to the ground, so close that it is impossible, with the usual harvester, to get under the crop with the sickle bar without destroying or losing a part of the valuable seed.

A further object is to provide a reel that will lift the crop and support it during the cutting operation and pass it back and onto a carrier or draper for disposal or passage into the thresher.

A still further object lies in the provision of a harvester reel which is also adaptable for use in connection with fallen or down grain, that is, grain that has become too heavy to support itself or which, by reason of soil conditions or storm, has fallen and is no longer erect and is frequently tangled and matted so that the usual harvester reel is incapable of handling or meeting this condition.

Other objects and advantages of the invention will be apparent during the course of the following description.

In the accompanying drawings forming a part of this specification and in which like numerals are employed to designate like parts throughout the same, Figure 1 is an end view of my reel, shown mounted on the usual reel support and disclosing the adjustable features of the reel to meet varied conditions and also the mechanism by which the reel fingers are maintained in a working relation with the crop.

Figure 2 is a fragmentary view, partly in section, of one end of a reel disclosing the features of my invention in connection therewith.

Figure 3 is a perspective view of a crank shaft member used in cooperation with the reel and provided with the devices for accomplishing our intended purpose.

Figure 4 is a fragmentary section of a portion of the reel showing the manner of mounting the finger shafts into the reel spider head, disclosing the bracing means and the crank means for controlling the fingers.

Figure 1:
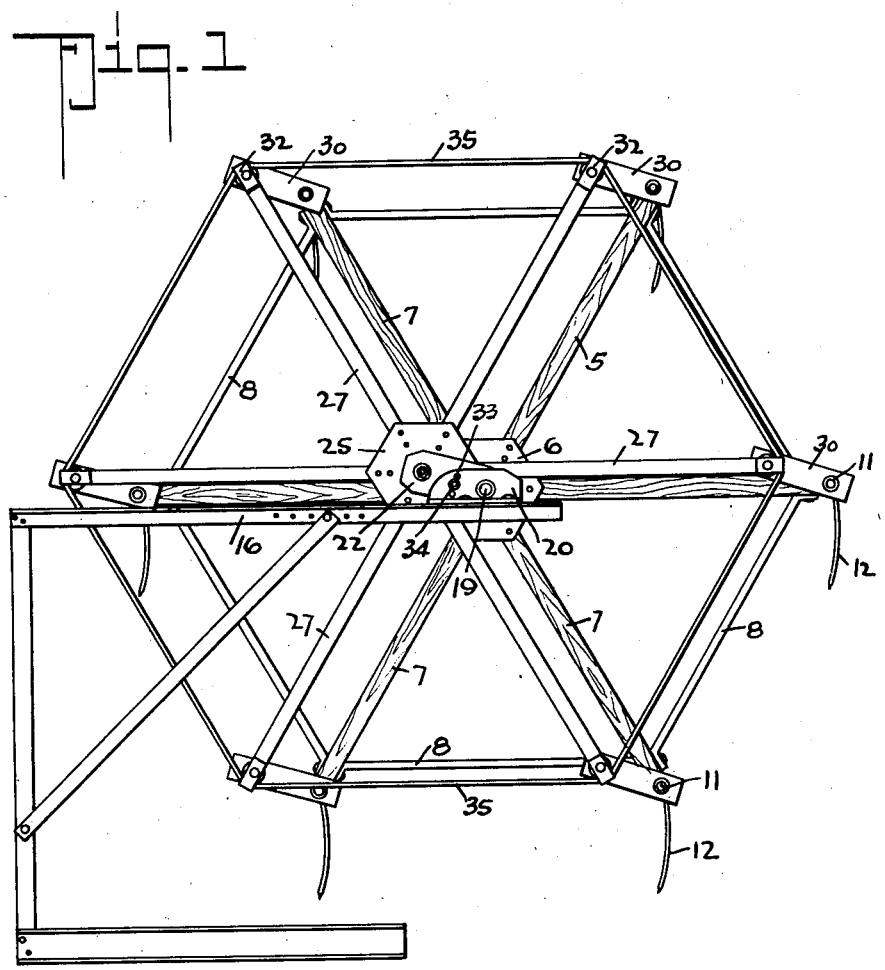

In the drawings wherein, for the purpose of illustration, is shown a preferred embodiment of our invention, the numeral 5 discloses a reel head or spider made up of the usual hub member 6 and a multiplicity of spider arms 7 radiating therefrom and joined or braced at or near their outer end by bracing rods or tubular braces 8. These braces provide the desired rigidity at approximately the outer end of the spider arms.

On their extreme ends the spider arms are slotted as at 9 and are formed with a concave end 10 to provide a seat or part bearing for the tubular reel shafts 11 which carry a series of spring-supported fingers 12 at spaced intervals along the length of the shaft. A strap 13 is formed to make the other half of the bearing for the reel shafts 11 and one leg of the strap is disposed in the slot 9 and a bolt 14 passing edgewise through the spider arm and strap and the braces 9, as well, serve for a simple and efficient means of assembling the bearing, the braces, and for supporting the shaft 11.

The spider 7 is supplied with a suitable hub member 6 formed of two plates, one on each side of the spider arms and bolted thereto, the hub being welded or fixed to a central, hollow axle shaft 15.

It is usual to provide three or four of the spider heads 7 in a complete reel, depending somewhat upon the length of the reel and the conditions in which it has to operate. Each of these spider heads are mounted upon a shaft 15 at spaced intervals and are fixedly attached thereto so that the outer end of the radial arms 7 will properly support the shafts 11 in their intended work. On the inner end of the shaft 15, that is, the end closest to the havesting machine which is usually of the traveling harvester type, the shaft 15 supports a sprocket or other rotating element and, of course, that end of the shaft is also mounted upon a suitable support similar to 16, disclosed in Figure 1.

The operating device for our invention is mounted upon the opposite or outer end of the reel, the reel itself being supported in a crank element 17 and particularly upon a stub 18 which is inserted into the hollow or tubular reel supporting shaft 15. A short stub shaft 19 on the crank member 17 is carried in a suitable bearing 20 mounted upon the support 16 which is usually extended from the draper frame or back screen of the draper as illustrated in Figure 1. The crank shaft has a wrist pin 21 offset from the aligned shafts 18 and 19 and is supported in its position by side plates 22 and 23 all suitably welded or formed to make a rigid crank construction.

Upon the plate 23 is a series of holes 24 equally spaced and radially formed in the plate, using the center of the shaft 19 as the radial center therefor. Mounted upon the wrist pin 21 is a spider frame 25 having a suitable hub 26 for cooperation therewith and a series of arms 27 extending radially therefrom and formed of strap iron or other light suitable material. On the outer end of each of these arms is a hole 28 for receiving a pin 29 formed on the outer end of a crank member 30 which itself is mounted on the extreme and outer end of each of the shafts 11. The extreme end of the arms 27 are bent over as best illustrated in Figure 2 to encompass a nut 31 which supports the end of the radial arms 27 to the pin 29 to hold these parts in a working relation.

Passing from arm to arm and located in the turned end thereof, we pass a heavy wire or light rod 35 after the manner illustrated in Figure 1 to provide rigidity and proper support for this spider structure and we weld the rod or wire to the turn 32 in order to insure a proper and rigid support. In the bearing support 20, which we use for supporting the crank member, we place a suitably sized hole 33 and through the use of a pin 34 passing through this hole and through any one of the series of holes 24, we are enabled to adjust our reel so that the fingers 12 may be positioned properly for the work that the reel is about to do. By making the proper adjustment we may advance the fingers either forward or back, as necessity may demand, to insure that as the fingers pass into the crop they will have the proper angular set and effective position to pick up the crop and support it at the time of cutting and to further pass the crop backward and onto the draper whence it is carried to the thresher.

Through the construction that we have devised and adopted for our needs, including a radial head offset from the reel proper and connected through link members 30 to the rotatable shafts 11, we are enabled to insure a constant and uniform action on all of the fingers 12 and as the reel is revolved, these fingers will have a general downward pitch, will enter the crop at the most favorable angle, and as they move in rotation, they still maintain their general position with respect to the perpendicular, to the end that the work of picking up the grain and supporting it during the cutting action and passing it back will be accomplished in the most advantageous manner and to the further end that the entangling of the grain or crop will be rendered at a minimum and, therefore, time will not be lost in stopping the machine while any entangled mass is removed from its contact with the reel.

Having operated this reel through several seasons, we have had the opportunity to closely observe the benefits that we have herein pointed out and have, therefore, devised the structure of our invention in a manner most suitable for its effective operation and for the saving of time and for a greater efficiency than we have hithertofore found in any reels for a like purpose.

We have avoided the usual heavy and inefficient sprocket and chain combinations that are intended to accomplish the same purpose and, through an extremely light structure, have provided a reel suitable for all kinds of crops and which will be effective under all conditions effecting traveling harvester operation.

It will be understood that the reel itself will be revolved in the usual manner and by power supplied from some suitable source, usually on the harvester or harvester drive and that, through the operation of the reel the offset radial head, through the link connections on the pivoted shafts 11, will cause the tines mounted on those shafts to assume a constantly relative position, subject to adjustment, that will permit the fingers 12 to properly enter the crop, support it, handle it, and leave it without picking up any of the crop and revolving it around with the reel.

It is to be understood that the form of our invention, herewith shown and described, is to be taken as a preferred example of the same and that various changes in the shape, size, and arrangement of parts may be resorted to without departing from the spirit of our invention, or the scope of the claims herein.

Having thus fully described our invention, what we claim as new and desire to secure by Letters Patent is:—

1. The combination with a rotary reel, its shaft, bearings for the shaft, and adjustable teeth mounted on the periphery of the reel, of a rotary frame having its axis offset from the reel shaft, crank arms pivoted on the rotary frame and pivotally connected with said adjustable teeth, a supporting frame, a U-shaped adjusting member having alined journals one of which has a concentric bearing in the reel shaft and the other a bearing in the frame, a bearing hub for the rotary frame journaled in the free end of the U-shaped member, and means engaging the frame and the U-shaped member for holding the latter in adjusted position.

2. The combination with a rotary reel, a shaft therefor having a concentric end socket, a frame, and adjustable fingers mounted on the reel, of a crank member having alined journals and bearings for said journals in said shaft socket and frame, a spider frame having a hub journaled at the off-set end of said crank member, said crank member having a series of holes, a retaining pin mounted in a hole of the frame for selective engagement with said series of holes, and crank-members operatively connecting said spider frame with the adjustable fingers.

3. The combination with a supporting frame, a rotary reel having a tubular central shaft, adjustable shafts journaled at the periphery of the reel, and fingers mounted on said adjustable shafts, of a pair of alined and spaced stub shafts one of which has a concentric journal bearing in the tubular reel shaft and the other having a journal bearing in said frame, a pair of spaced parallel plates fixed to adjoining ends of said stub shafts, a wrist pin rigid with the free ends of said plates, a spider frame having its hub journaled on said wrist pin, crank arms operatively connecting said spider frame with the adjustable shafts, and coacting means on one of said plates and the frame for holding the spider frame in adjusted position.

HORACE D. HUME.
JAMES E. LOVE.